Dec. 14, 1954  F. G. HILL  2,696,801
MILKING TABLE
Filed Dec. 11. 1953  2 Sheets-Sheet 1
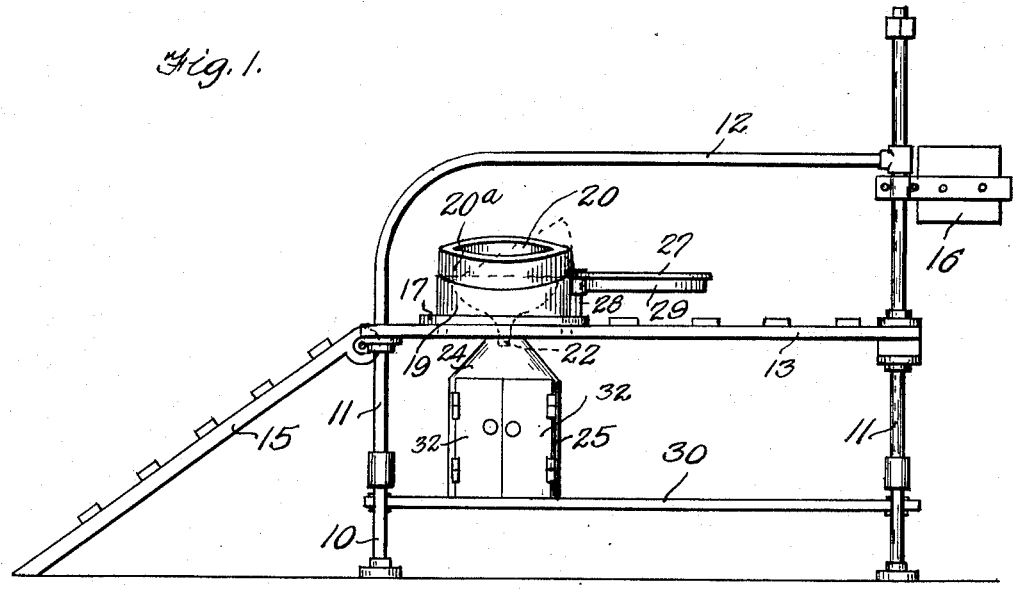
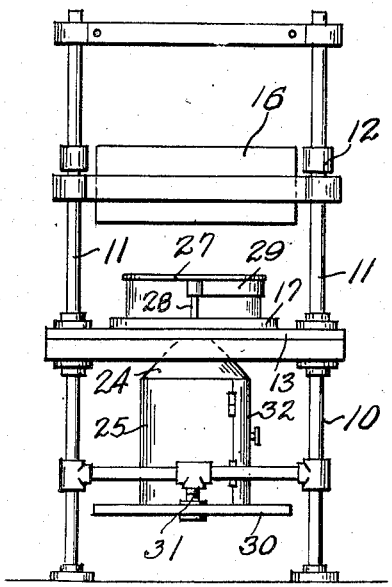
INVENTOR
FREDERICK G. HILL
BY
HIS ATTORNEY Dec. 14, 1954  F. G. HILL  2,696,801
MILKING TABLE
Filed Dec. 11, 1953  2 Sheets-Sheet 2
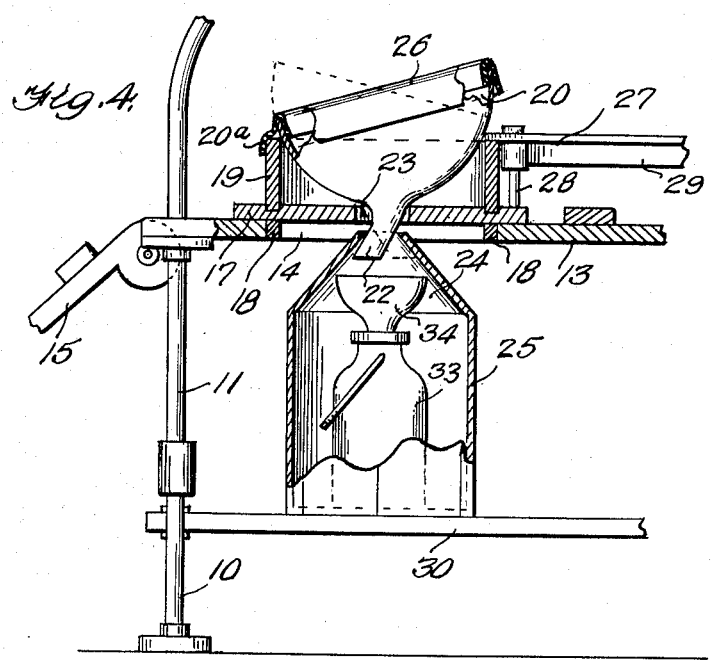
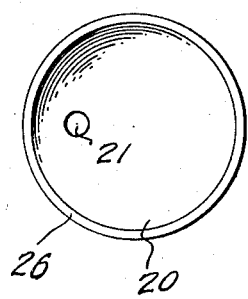
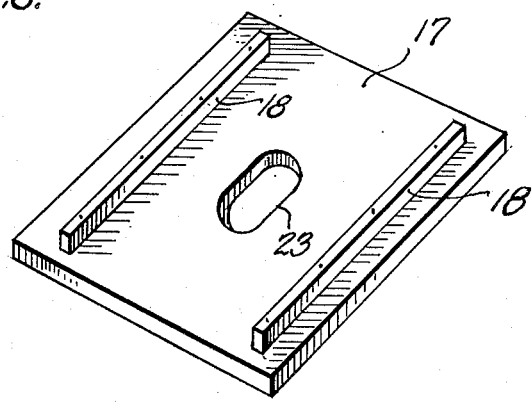
INVENTOR
FREDERICK G. HILL
BY
HIS ATTORNEY

United States Patent Office 2,696,801
Patented Dec. 14, 1954

2,696,801

MILKING TABLE

Frederick G. Hill, Chester, Mass.

Application December 11, 1953, Serial No. 397,590

7 Claims. (Cl. 119—14.03)

This invention relates to milking tables, and more particularly to goat milking tables, and has for one of its objects the production of a simple and efficient means for facilitating the milking of goats in a manner whereby the milk will be shielded from dirt and hair while a goat or other milk producing animal is being milked.

A further object of the invention is the production of a milking table wherein a filtering milk receiving container is supported below the animal supporting platform thereof, and wherein said container receives milk from an adjustable milk receiving basin carried by the animal supporting platform.

Other objects and advantages of the present invention will appear throughout the following specification and claims.

In the drawings:

Figure 1 is a side elevational view of the milking table;

Figure 2 is an end view looking at the front thereof;

Figure 3 is an enlarged fragmentary top plan view of the table showing the basin supporting means with the lid thereof in an open position;

Figure 4 is an enlarged fragmentary side elevational view partly in section showing the rear portion of the milking table;

Figure 5 is a top plan view of the basin;

Figure 6 is a perspective view showing the under face of the removable panel.

By referring to the drawings in detail it will be seen that 10 designates the milking table having vertical supporting standards 11 and side rails 12. An upper platform 13 is carried by the standards 11 and is provided with a rectangular aperture 14 near the rear end thereof. An inclined runway 15 of the conventional type leads to the upper platform 13 and is connected in a conventional manner to the rear end of the platform 13. A conventional feed box 16 is carried at the front end of the table 10, as shown.

A removable panel 17 fits upon the upper platform 13 and this panel 17 is provided with cleats 18 upon the under face thereof which fit snugly against the forward and rear edges of the aperture 14 to anchor the panel 17 in a set position over the aperture 14. This panel constitutes a closure for the aperture 14, as shown in Figure 4. This panel carries an upstanding collar 19 within which collar 19 adjustably fits a semi-spherical basin 20. The basin 20 is concavo-convex in cross section and is provided with an off-center discharge aperture 21 which communicates with an angularly extending discharge nozzle 22. The basin 20 is of greater diameter than the collar 19 and is adapted to rest upon the upper edge of the collar 19, as shown in Figure 4. The panel 17 is provided with an elongated central aperture 23 which extends in a direction transversely of the panel 17 and platform 13. The angularly extending discharge nozzle 22 extends down through the elongated aperture 23 and into the upper tapered end 24 of the housing 25. Since the basin 20 rests or is supported upon the upper edge of the collar 19, and the angularly extending nozzle 22 which is mounted off-center of the basin extends down through the elongated aperture 23, the angle of the upper edge 26 of the basin may be changed merely by rotating the basin upon the collar. In this way the basin may be adjusted to catch milk at a proper angle while a goat or other milk producing animal is being milked. A shielding skirt 20ᵃ is carried by the upper edge and outer face of the basin 20 to overhang the upper edge of the collar 19 and to thereby prevent milk from passing between the skirt 20ᵃ and the collar 19.

A circular cover 27 is pivotally mounted upon an upstanding journal pin 28 adjacent the collar 19, and this cover 27 may be swung to and from a closed position over the collar 19. A depending semi-circular flange 29 is carried by the bottom face of the cover 27 to limit the swing of the cover in one direction and to constitute an abutment when the cover 27 is swung to a closed position over the collar 19 to shield the entrance opening through the collar when the device is not in use. The cover 27 may be removable, if desired, within the spirit of the invention.

A lower platform 30 is suspended from suitable hangers such as the hanger 31 shown in Figure 2, from between the forward and rear ends of the milking table. The lower platform 30 is spaced below the upper platform 13 and supports the housing 25 just below the basin 20. The housing 25 is provided with suitable doors 32 to permit access to the milk pail 33 of any suitable type which is adapted to be mounted in the housing 25. A suitable filter 34 is carried by the pail 33 in close relation to the nozzle 22 of the basin 20 to direct milk from the basin 20 into the pail 33.

From the foregoing description it will be seen that a simple and efficient means has been provided to facilitate the milking of goats and the like, and at the same time shield the milk receiving container against the entrance of dirt, hair and the like, prior to milking, while milking, and after milking. The parts are also readily removable for cleaning or replacement. After the basin 20 is removed, the cover 27 may be immediately swung to a closed position over the collar 19 thereby shielding the opening 23 against the entrance of dirt, hair, and the like. Furthermore, the milk receiving container 33 is mounted within the housing 25 directly below the upper platform 13 and rests upon the lower platform 30 out of contact with the animal which is being milked. The table itself may be fastened or anchored to the floor in any desired manner. The panel 17 may be removed for cleaning after each milking, and the cover may be easily and readily closed when desired to shield the milk receiving receptacle. The lower platform 30 may be adjusted vertically upon the hangers to support the milk receiving container close to the panel 17. This structure above described facilitates the maintenance of sanitary conditions in dairies, and assists in meeting sanitary standards and codes.

It should be understood that certain detail changes in the mechanical construction and arrangement of parts may be employed without departing from the spirit of the invention, so long as such changes fall within the scope of the appended claims.

Having described the invention, what I claim as new is:

1. A milking table of the class described comprising an upper platform and a lower platform arranged one above the other in spaced relation, said upper platform having an aperture therein, a removable panel fitted in said aperature, said lower platform being adapted to support a milk receiving receptacle below said aperture, and means carried by said panel for receiving and delivering milk from a milk producing animal to said receptacle which is carried by said lower platform.

2. A milking table as defined in claim 1, wherein said last mentioned means comprises a removable semi-spherical basin having a discharge nozzle adapted to direct milk from said basin into said receptacle.

3. A milking table as defined in claim 1, wherein said last mentioned means comprises a removable basin having a discharge nozzle located off-center for directing milk from said basin into said receptacle, and said panel having a transverse elongated aperture receiving said nozzle to facilitate the adjustment of said basin at a selected angle relative to said panel.

4. A milking table as defined in claim 1, wherein said last mentioned means comprises a removable basin having a discharge nozzle located off-center for directing milk from said basin into said receptacle, said panel having a transverse elongated aperture receiving said nozzle to facilitate the adjustment of said basin at a selected angle relative to said panel, and said panel having an upstanding collar surrounding said aperture in said panel and constituting a support for said basin.

5. A milking table as defined in claim 1, wherein the lower platform is adjustable vertically relative to said upper platform.

6. A milking platform as defined in claim 1, wherein a housing is carried by said lower platform, said housing encasing said receptacle.

7. A milking table as defined in claim 1, wherein said last mentioned means comprises a removable semi-spherical basin having a discharge nozzle adapted to direct milk from said basin into said receptacle, and a shielding skirt carried by the upper edge and outer face of said basin.

References Cited in the file of this patent

UNITED STATES PATENTS

| Number | Name | Date |
|---|---|---|
| 150,589 | Lowe | May 5, 1874 |
| 293,839 | Addison | Feb. 19, 1884 |
| 684,720 | Reid | Oct. 15, 1901 |
| 1,512,753 | Foster | Oct. 21, 1924 |